(12) United States Patent
Bernardini et al.

(10) Patent No.: US 11,594,223 B1
(45) Date of Patent: Feb. 28, 2023

(54) OUTSIDE ORDERING SYSTEM

(71) Applicant: Valyant AI, Inc., Denver, CO (US)

(72) Inventors: Marc Bernardini, Englewood, CO (US); Jacob Poore, Loveland, CO (US)

(73) Assignee: Valyant AI, Inc., Denver, CO (US)

( * ) Notice: Subject to any disclaimer, the term of this patent is extended or adjusted under 35 U.S.C. 154(b) by 0 days.

(21) Appl. No.: 17/496,425

(22) Filed: Oct. 7, 2021

(51) Int. Cl.
*G10L 15/22* (2006.01)
*G06Q 30/0601* (2023.01)
*G10L 13/02* (2013.01)
*G10L 21/0364* (2013.01)

(52) U.S. Cl.
CPC .......... *G10L 15/22* (2013.01); *G06Q 30/0601* (2013.01); *G10L 13/02* (2013.01); *G10L 21/0364* (2013.01)

(58) Field of Classification Search
USPC ............... 704/231, 232, 246, 247, 251, 252
See application file for complete search history.

(56) References Cited

U.S. PATENT DOCUMENTS

| | | | | |
|---|---|---|---|---|
| 5,321,848 A * | 6/1994 | Miyahira | ............... | H04M 9/001 379/388.01 |
| 11,354,760 B1 * | 6/2022 | Dorch | ............... | G06V 20/10 |
| 2003/0225622 A1 * | 12/2003 | Doan | ............... | G06Q 50/12 705/26.1 |
| 2007/0007331 A1 * | 1/2007 | Jasper | ............... | G07F 7/00 235/379 |
| 2007/0208626 A1 * | 9/2007 | Awiszus | ............... | G06Q 10/087 705/26.8 |
| 2010/0046510 A1 * | 2/2010 | Koster | ............... | H04M 11/025 370/355 |
| 2013/0080269 A1 * | 3/2013 | Awiszus | ............... | G06Q 30/0613 705/15 |
| 2013/0138515 A1 * | 5/2013 | Taniguchi | ............... | G06Q 30/0635 705/15 |
| 2014/0279080 A1 * | 9/2014 | O'Gwynn | ............... | G06Q 50/12 705/15 |
| 2018/0330358 A1 * | 11/2018 | May | ............... | G06Q 20/327 |
| 2019/0171711 A1 * | 6/2019 | Carpenter, II | ............... | G10L 13/02 |
| 2020/0273089 A1 * | 8/2020 | Siefken | ............... | G06Q 50/12 |
| 2022/0301082 A1 * | 9/2022 | Dorch | ............... | G10L 15/18 |

\* cited by examiner

*Primary Examiner* — Leonard Saint-Cyr
(74) *Attorney, Agent, or Firm* — Hall Estill Law Firm

(57) ABSTRACT

An ordering system can be positioned partially, or completely, outside in a retail environment with an ordering device located outside of a building on a site. The ordering device receiving a first audio stream concurrently with a second audio stream from an employee and proceeds to capture the first audio stream with a first port of an on-site computing device while capturing the second audio stream with a second port of the on-site computing device. A customer strategy can be executed with an intelligence module of the on-site computing device connected to the ordering device with the on-site customer strategy directing automated interactions with a first on-site customer to compile a retail order. The employee may communicate directly with the intelligence module via the second port without interrupting the first audio stream.

20 Claims, 4 Drawing Sheets

OUTSIDE ORDERING SYSTEM

SUMMARY

Assorted embodiments are directed to an ordering system optimized for operation partially, or completely, outside a retail environment.

An ordering system, in accordance with various embodiments, has an ordering device positioned outside of a building on a site to receive a first audio stream from the ordering device concurrently with a second audio stream from an employee. The first audio stream is recorded with a first port of an on-site computing device concurrently while the second audio stream is recorded with a second port of the on-site computing device. An ordering module of the on-site computing device combines the first audio stream with the second audio stream to provide a seamless third audio stream.

Embodiments of an ordering system position an ordering device located outside of a building on a site. The ordering device receives a first audio stream concurrently with a second audio stream from an employee and proceeds to capture the first audio stream with a first port of an on-site computing device while capturing the second audio stream with a second port of the on-site computing device. A customer strategy is executed with an intelligence module of the on-site computing device connected to the ordering device with the on-site customer strategy directing automated interactions with a first on-site customer to compile a retail order. The employee communicates directly with the intelligence module via the second port without interrupting the first audio stream.

Other embodiments of an ordering system connect an ordering station to a computing device on a site via a first electrical interconnection. A customer presence sensor is connected to the computing device on the site via a second electrical interconnection positioned in a common conduit as the first electrical interconnection. The second electrical connection is customized to prevent audio signals passing through the first electrical interconnection from interfering with operation of the customer presence sensor.

DETAILED DESCRIPTION

Embodiments of the present disclosure are generally directed to an ordering system that is optimized to incorporate artificial intelligence and practical ordering optimizations into a retail environment where customers are positioned outside.

In retail environments where ordering takes place outside, assorted dynamic conditions complicate the implementation of artificial intelligence. For instance, variable wind, customer position, and external sounds can inhibit the optimal performance of microphones that correspond with input for artificial intelligence. The utilization of human intervention with artificial intelligence ordering system is also riddled with complications, such as talking over a customer, missing portions of an order, or confusing the artificial intelligence engine. As such, there is a continued need for optimizations for ordering systems employing artificial intelligence with customers positioned outside a retail building.

Figure 1:
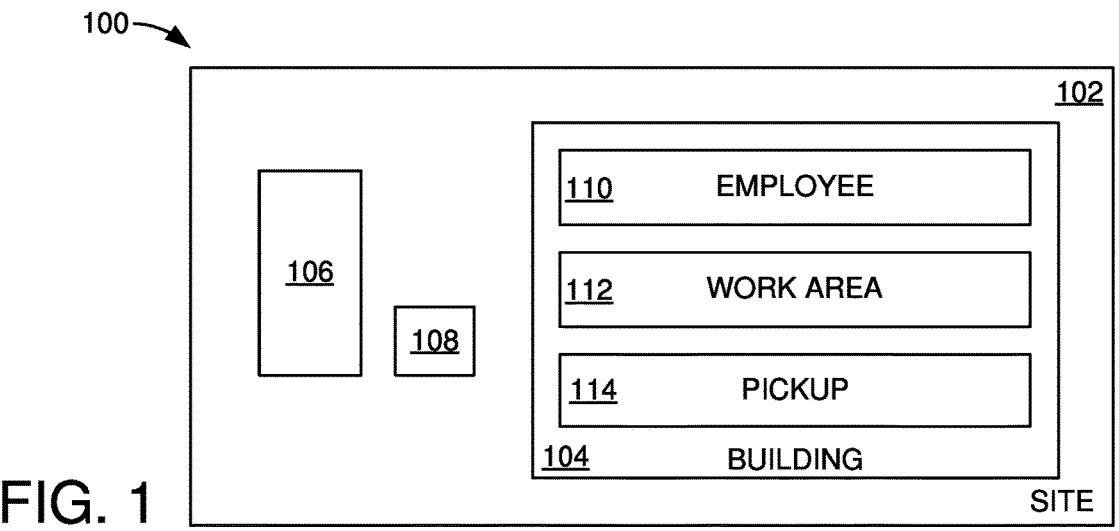
FIG. 1 is a block representation of an example ordering environment in which various embodiments can be practiced.

In the example business environment 100 shown as a block representation in FIG. 1, assorted embodiments of an intelligent ordering system can be practiced. It is noted that the business environment 100 may comprise one or more retail, restaurant, and banking buildings that provide food, goods, and/or services for customers while the customer remains in a vehicle. That is, the business environment 100 is configured to allow a customer to remain in a vehicle while ordering a service/good/food and continuously until the service/good/food has been satisfied.

FIG. 1 depicts a block representation of portions of an example ordering environment 100 in which assorted embodiments can be practiced. As shown, a single business is positioned on a site 102 and has at least one building 104 outfitted to fulfill orders made by a customer 106, which is positioned outside the building 104, such as in a vehicle or on foot. An outside ordering device 108 connects the customer 106 to a human employee 110.

With the advent of mobile computing and online ordering platforms, some embodiments involve the customer 106 communicating an order to the employee 100 while other embodiments involve the customer 106 bypassing ordering and instead simply picking up a completed order made online. Regardless of whether the human employee 110 communicates directly with the customer 106, a customer's order prompts a work area 112, and the area's constituent staff, into actions that satisfy the order(s).

Once an order has been satisfied, the customer 106 can receive the ordered service/good/food via a drive-through pickup 114 or a delivery service by the human employee 110. It is noted that the work area 112 is not limited to a particular activity, good, or service. Hence, the work area 112 can consist of food preparation, banking operations, or packaging of purchased goods without limitation.

The incorporation of an employee 110 into the ordering process, along with the difficulties inherent in outside ordering, such as wind and sub-optimal microphone placement relative to a customer, create communication difficulties that result operational inefficiencies. For instance, inaccurate or incomplete orders from a customer 106 due to communication delays and/or degradation can frustrate the customer 106 and cause general dissatisfaction with a retail establishment and lost profits.

Figure 2:
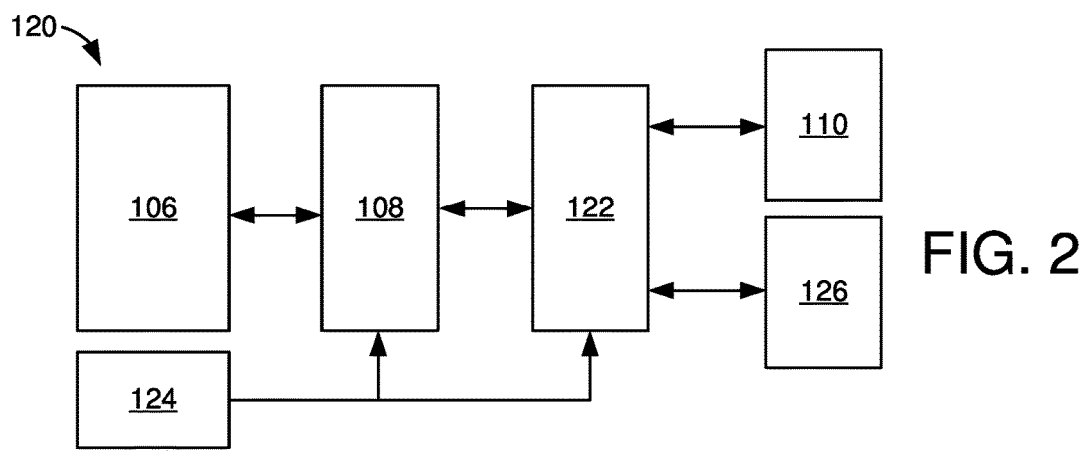
FIG. 2 displays a block representation of an example ordering environment arranged in accordance with some embodiments.

FIG. 2 depicts a block representation of another example ordering environment 120 that incorporates computing capabilities for taking outside customer orders. Employing one or more computers 122 provides processing and memory that allows artificial intelligence, as well as other software, to be executed as part of a customer's order. Some embodiments activate and/or notify the computer 122 that a customer 106 is present via one or more sensors 124, such as ultrasonic, inductive, pressure, or magnetic vehicle devices.

While the computer 122 may operate independently to interact with a customer 106, it is contemplated that a local employee 110 and/or remote employee 126 can suspend the artificial intelligence, bypass any computing/software, or temporarily pause less than all software execution to interact directly with the customer 106. Despite the utilization of sophisticated computers 122, the suspension of artificial intelligence, or other software, to allow intervention of an employee can be slow and add complexity to returning to software-based customer ordering. That is, suspending software operation for an employee to communicate with a customer is wrought with operational difficulties in returning to software-based ordering, which necessitates an employee to inefficiently finish an order with a customer if software is suspended.

With the possible involvement of artificial intelligence/software ordering and employee interactions with customers, existing technology has failed to optimize the incorporation of local and/or remote employees with artificial intelligence order handling. Additionally, existing technology utilize a single audio stream shared by the customer 106, employee 110, and artificial intelligence of a computer 122, which is plagued by convoluted audio from different people that confuses the artificial intelligence, leads to delays, and causes incorrect intelligence translation of audio. Accordingly, embodiments of an outside ordering system utilize dual audio channels that allow for concurrent recording of customers 106 and employees 110 that leads to accurate and efficient operation of artificial intelligence to carry out an ordering operation from the customer 106.

Figure 3:
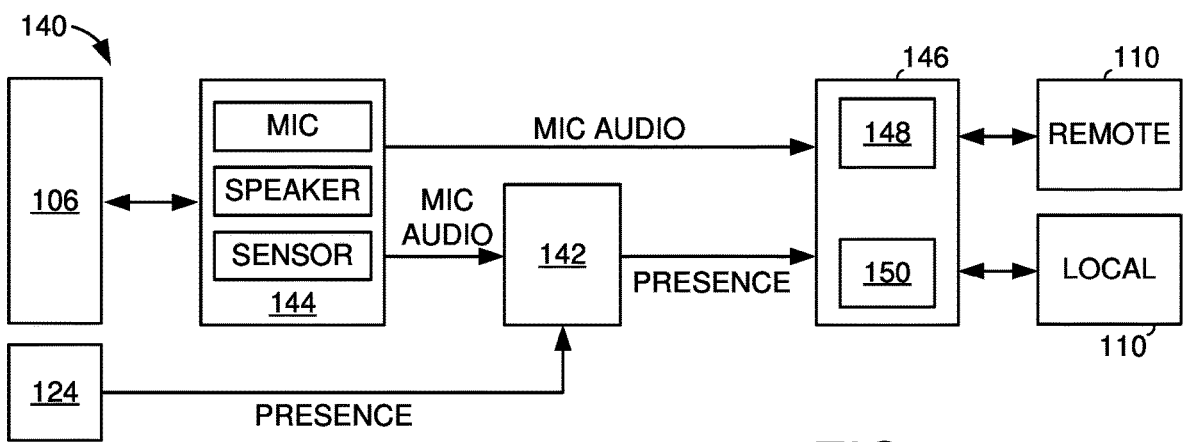
FIG. 3 shows an example ordering system configured in accordance with assorted embodiments.

FIG. 3 depicts a block representation of portions of an example ordering system 140 configured and operated in accordance with various embodiments. A base station 142 can be connected inline between an ordering device 144 and an employee 110, which can be physically positioned on-site or off-site. The base station 142 can provide some computing capabilities, such as vehicle detection via one or more connected sensors 124, wireless communications from the ordering device 144 to/from an employee 110, and noise cancelling of verbal commands from a customer 106. However, existing base stations 142 have limited computing capabilities with respect to providing artificial intelligence or optimizing the audio communications between customer 106 and employee 110.

Accordingly, various embodiments connect a computing device 146 inline between the base station 142 and employee 110 to complement the capabilities of the base station 142 while optimizing ordering, communications, and delivery of artificial intelligence. The computing device 146 is configured to provide at least 4 separate audio input channels that can be individually modified, recorded, and amplified to increase the clarity and timing of communications while conducting an order as well as improve the accuracy of artificial intelligence input and output.

As shown, output from one or more microphones is concurrently delivered to the base station 142 and to the computing device 146. The dual audio input to both the base station 142 and computing device 146 allow for simultaneous analysis, recording, and optimizations. It is noted that the dual microphone inputs allow the computing device 146 to passively conduct artificial intelligence, audio adjustments, and employee 110 interactions. Meanwhile, the base station 142 can conduct all normal activity with respect to vehicle detection and audio communications, but outputting to the computing device 146 instead of directly to an employee 110. The capability of the computing device 146 to provide dual concurrent audio streams allows for latency-free audio streams between the customer 106 and employee 110 while providing artificial intelligence, audio recording, and audio parameter optimization.

In accordance with some embodiments, the computing device 146 has an ordering module 148 that intelligently monitors audio and outputs audio to the customer 106 with optimal timing and audio parameters. The computing device 146 may also employ an intelligence module 150 that executes artificial intelligence in response to detected and/or predicted ordering aspects. The utilization of separate, concurrent audio streams from the employee 110 and the customer 106 to the computing device 146 allows for strategic audio optimizations, such as preamp, digital signal processing, and amplification alterations, which provides recorded and passthrough audio that is customized for clarity, accuracy, and timing. It is noted that by splitting audio streams, the computing device 146 can conduct artificial intelligence, along with other software, concurrently while audio recording and/or optimizations are being conducted, which provides a seamless ordering experience to the customer 106.

The multiple audio stream and intelligence capabilities of the computing device 146 further allows local and/or remote employee 110 interactions directly with the computing device 146 without delaying, interrupting, or interfering with the execution of artificial intelligence or communications from a customer 106. Some embodiments utilize the base station 142 to split portions of audio streams from the ordering device 144 and/or employee 110, but such configuration is not required or limiting. By employing the base station 142 to provide dynamic audio input and/or output allows the computing device 146 to more efficiently evaluate and optimize audio parameters, such as gain, processing, filtering, and noise cancelling, which allows for more processing to be utilized for artificial intelligence to operate and serve a customer 106.

Figure 4:
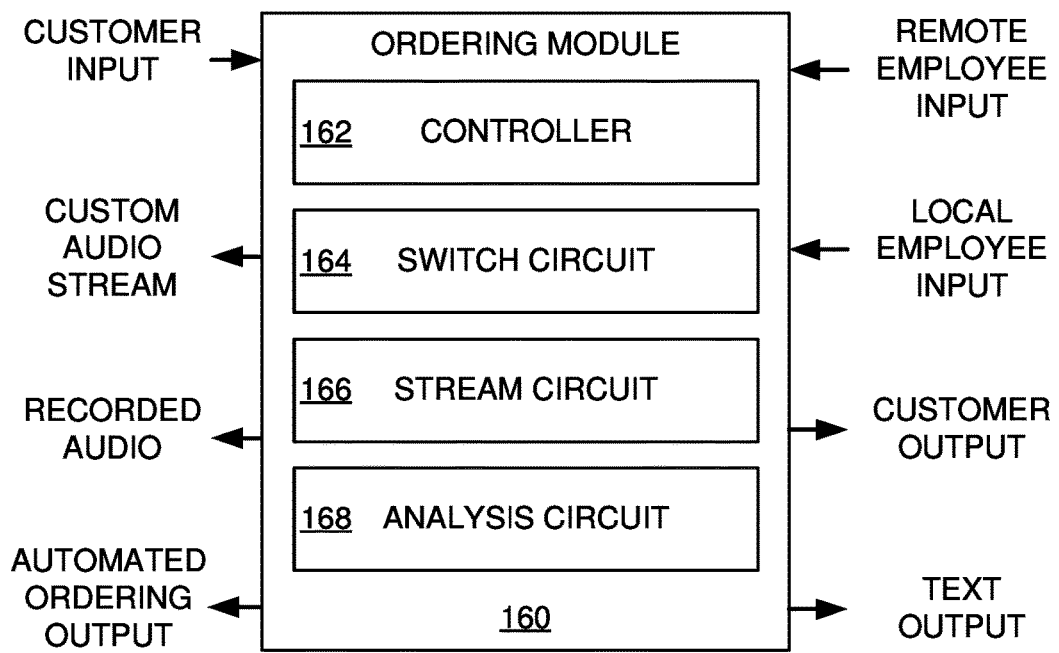
FIG. 4 illustrates a block representation of an example ordering module that can execute various embodiments of an ordering system.

FIG. 4 depicts a block representation of an example ordering module 160 configured in accordance with various embodiments to operate as part of an ordering system. The module 160 can employ one or more controllers 162, such as a microprocessor or other programmable circuitry, to evaluate and optimize audio parameters between a customer and an employee. For instance, the controller 162 can determine if current audio parameters are optimal for a variety of criteria, such as customer position relative to an ordering device, loudness of customer, wind noise, speed of customer ordering, customer accent, and customer gender.

As such, the controller 162 can determine if current ordering factors are optimally served by current audio parameters, such as gain, noise reduction, and digital signal processing. If so, the controller 162 can prompt a switch circuit 164 to pass customer input to an employee and/or to an artificial intelligence engine. That is, the controller 162 and switch circuit 164 can determine if customer audio is optimized for current conditions and pass audio deemed clear, accurate, and not delayed to an artificial intelligence engine. Conversely, the switch circuit 164 can redirect customer audio to an employee or prompt the customer to repeat the order after audio parameters are customized to improve clarity and/or accuracy.

The ordering module 160 may additionally have the capability to dynamically control how audio streams are handled. A stream circuit 166, as shown, can direct the destination and/or recording of input data, audio, and commands from a remote source connected to the module 160 via a wired and/or wireless connection, an on-site employee, an on-site customer, and a remotely connected customer. The ability to identify audio, data, and command streams from different sources allows the stream circuit 166 to intelligently route audio to different destinations, record audio from different sources, and manipulate an audio stream to splice multiple streams together. For instance, the stream circuit 166 can delay an audio stream from one source to prevent interference and/or confusion to a customer, employee, and artificial intelligence engine.

An analysis circuit 168 can operate with the module controller 162 to evaluate if optimal audio conditions are present for a customer, employee, and/or artificial intelligence engine. That is, the analysis circuit 168 can detect current audio conditions, such as with environmental sensors, algorithms to determine audio characteristics of a customer, and signal-to-noise metrics, to determine if one or more amplification, filtering, or signal processing can improve the clarity and/or accuracy of an audio stream to optimize the a customer's, employee's, or intelligence engine's understanding of what is being said. The analysis circuit 168 can suggest audio modifications to a single audio stream, which can create an employee audio stream that is customized for detected customer characteristics and/or customer audio that is customized to be accurately interpreted by the artificial intelligence engine.

With the assorted circuitry, processing, and capabilities of the ordering module 160, two or more audio ports of a computing device can be utilized concurrently to evaluate and optimize audio streams as well as pause, delay, and reorganize portions of audio streams to provide coherent and uninterrupted audio recordings and playback to an audio destination. Despite the ability to optimize audio signals and streams, an outside ordering system can suffer from signal interference that can degrade audio stream clarity.

Figure 5:
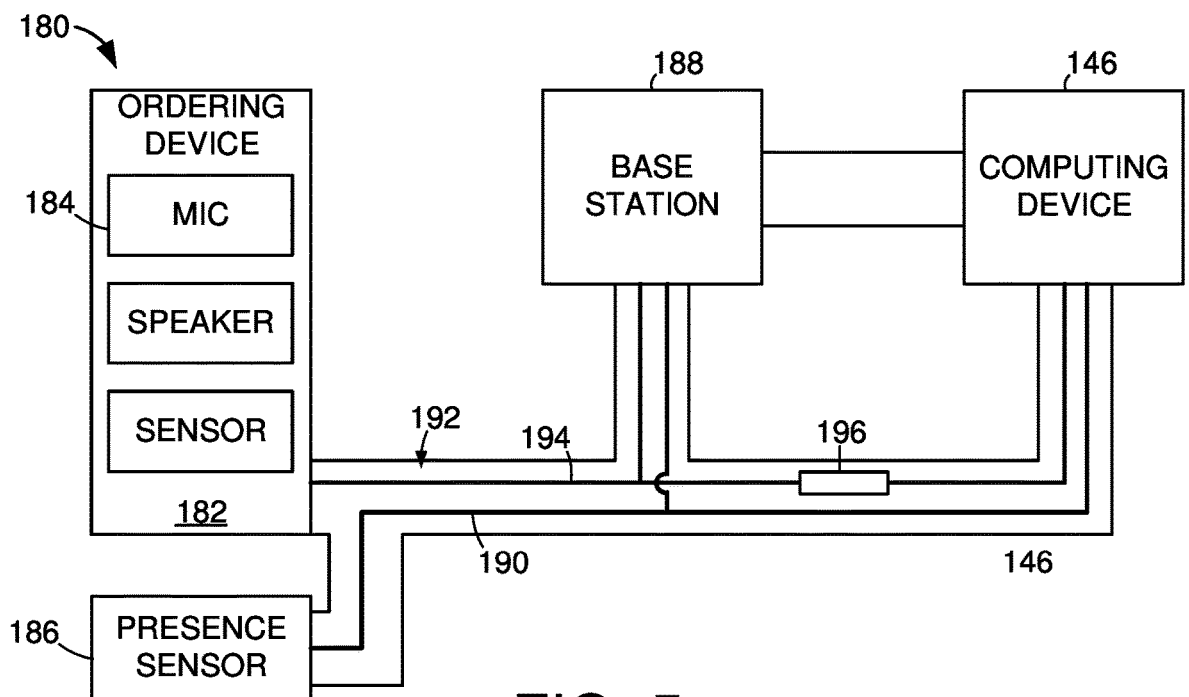
FIG. 5 depicts portion of an example ordering system arranged and utilized in accordance with some embodiments.

FIG. 5 depicts portions of an example outside ordering system 180 arranged in accordance with various embodiments. An ordering device 182 is physically positioned on a site and presents at least a microphone 184 (MIC) to a customer to allow audio input and ordering. It is contemplated that the ordering device 182 presents other ordering components, such as a graphical interface, optical sensors, and static displays.

A customer presence sensor 186 is positioned to detect the presence of a customer and alert a base station 188. While the sensor 186 may have wireless connectivity, the use of wireless customer detection can be wrought with delay and unreliability. Hence, embodiments utilize a wired connection 190 from the sensor 186 to a base station 188. The wired sensor connection 190 may be magnetically and/or electrically isolated in an individual conduit, but such configuration can be inefficient in terms of construction and maintenance. Accordingly, the wired connection 190 extends to the base station 188, in some embodiments, in a common conduit 192 as the electrical interconnections 194 for the various components of the ordering device 182.

It is noted that the physical proximity of the wired connection 190 with the interconnections 194 in the common conduit 192 can introduce interference, particularly with audio signals that are amplified and/or otherwise digitally processed. That is, the physical configuration of the wired connection 190 can jeopardize the accuracy and/or timing of detecting customers when positioned proximal other electrical interconnections, such as connections carrying amplified audio signals.

For these reasons, a computing device 146 can customize audio signals between the ordering device 182 and the base station 188 to not interfere, or otherwise degrade, operation of the wired connection 190 to detect the presence of a customer. While not limiting or required, audio signal customizations can be complemented by electrical components 196, such as capacitors, resistors, and filter, to limit transient signals that can interfere with the operation of the wired connection 190. It is contemplated that the computing device 146 can customize audio signals at selected times until initial customer detection and subsequently suspend audio signal customization to prevent sensor 186 interference, which allows any physically present electrical components 196 to condition the customer presence signals.

Figure 6:
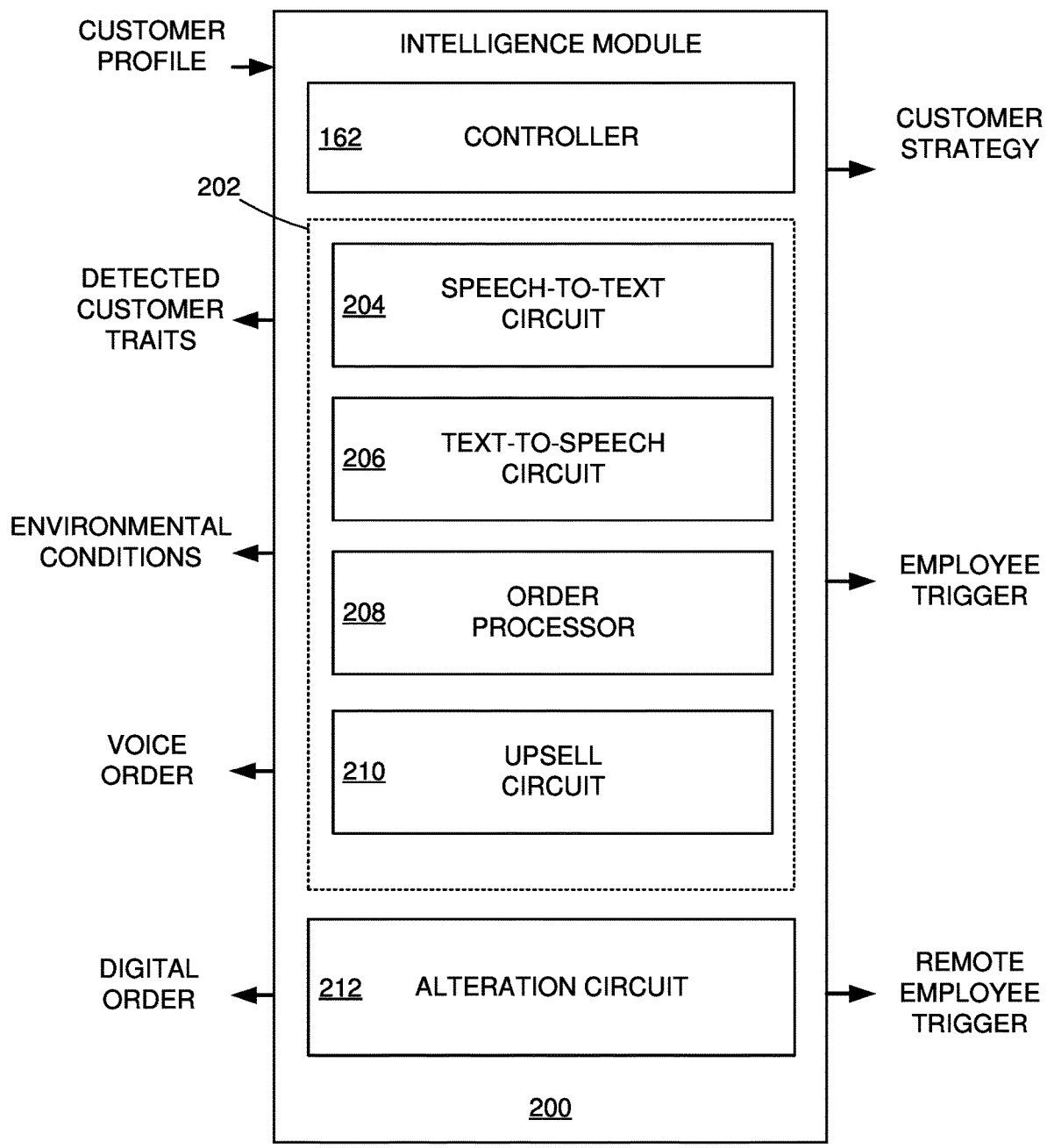
FIG. 6 conveys a block representation of an example intelligence module that can be employed in assorted embodiments of an ordering system.

FIG. 6 conveys a block representation of an example intelligence module 200 that can be utilized in an outside ordering system in accordance with some embodiments. It is noted, but not required, that the intelligence module 200 employs the same controller 162, or other processing capability, as the ordering module 160. However, a specific controller is not required as different circuitry of the intelligence module 200 can be programmable and provide capability to interpret input information, such as customer identification, customer detected characteristics, environmental information, voice characteristics, and digital order aspects, to create at least a customer strategy and triggers to direct order handling to an artificial intelligence engine 202 or an employee.

The artificial intelligence engine 202 has at least a speech-to-text circuit 204 and a text-to-speech circuit 206 that are operated by an order processor 208 to carry out automated customer interactions. That is, the order processor 208 can translate a customer's audio into text that can be analyzed and interpreted into a retail order as well as convert text generated by the order processor 208, such as order suggestions from an upsell circuit 210, into speech that is relayed to a customer. It is contemplated that the intelligence engine 202 communicates with a customer and/or employee via text only, but such configuration is not required. The upsell circuit 210 can take a variety of factors into account unrelated to the customer, such as time of day, weather, employee efficiency, employee availability, and location, and may also take into account information about the relative position of an order. For instance, if a customer has ordered burgers and a fry try to upsell a drink to make it a combo.

Regardless how the intelligence engine 202 communicates, the ability to ascertain characteristics about a customer, such as by identifying an existing customer profile, customer vehicle type, customer accent, customer gender, and customer mood, allows the upsell circuit 210 to generate one or more unprompted suggestions to the customer that can be injected into an audio stream without delaying, interrupting, or interfering with the audio stream by the ordering module 160. The use of dual audio ports in the computing device 146 employing the intelligence module 200 allows an employee to interact directly with the intelligence engine 202 without interrupting or delaying a customer's order that is concurrently taken and recorded on a separate audio port. An alteration circuit 212 allows the a local, or remote, employee to seamlessly make changes to the operation of the intelligence module 200 without interfering with the customer's order or delaying the intelligence engine's 202 interactions with the customer.

Through the autonomous operation of the intelligence engine 202 to take and satisfy customer orders, the intelligence module 200 can provide highly efficient retail transactions and customer throughput. The ability for an employee to communicate with the intelligence engine 202 directly and without interrupting a customer's order allows for strategic modifications to how the engine 202 operates, the orders the engine 202 generates, and/or the upsell options selected by the engine 202. Some embodiments allow for the employee to inject a personal, non-computer generated, text, audio snippet, or sound to the engine's interaction with a customer. That is, the intelligence module 200 can incorporate input from an employee that is seamlessly installed in an audio stream from the module 200 to the customer without degrading the input customer stream due to the use of multiple concurrent audio channels dedicated to customer/employee/intelligence engine operation.

The use of multiple independent audio channels for operation of an ordering system further allows the intelligence module 200 to record various aspects of encountered audio from customers and employees, which provides opportunities to separately analyze and learn how the automated interactions between the intelligence engine 202 and the customer can be improved. For instance, the intelligence engine 202 can employ machine learning and/or table based correlations on recorded employee and/or customer audio streams to develop and evolve interactions with customers to increase the satisfaction, efficiency, and profitability of automated ordering.

The ability to analyze separate customer and employee audio streams in real-time and recorded formats allows the intelligence module 200 to generate one or more customer strategies that prescribe alterations from default ordering parameters in response to detected, or predicted, triggers. A non-limiting example of a customer strategy prescribes different artificial intelligence themes, responses, timing, and/or tone in response to customer traits, such as gender, type of vehicle, type of apparel worn, age, facial gestures, volume, and hair style, detected from one or more optical and/or acoustic sensors. For example, the intelligence module 200 can proactively generate multiple different customer strategies that are executed when a customer trigger is detected, such as modifying the tone and timing of automated interactions in response to detecting the customer is an older aged lady or young man.

Another example involves changing from a strict ordering protocol to a conversational protocol with the automated customer interactions, as generated by the intelligence engine 202, in response to detection of a minivan or sport utility vehicle. Such conversational protocol may involve predetermined, or spontaneous, customer questions and subsequent follow up responses from the intelligence engine 202 while the strict ordering protocol may involve no questions or responses other than what is needed to complete an order. It is contemplated that the customer strategy can prescribe different upsell tactics in response to predetermined triggers. For instance, detection of a man within a demographic range of age and ethnicity can prompt a first set of upsell suggestions for the automated intelligence interactions while a woman driving a sports car may prompt a different second set of upsell suggestions. It is noted that upsell suggestions may involve asking a customer if they want a different, modified, or additional order item.

A customer strategy may involve alterations to operational parameters in response to detected, or predicted, triggers. For example, detection of an elevated tone or timing for a customer can prompt recording customer commands and slowing the playback for the intelligence engine 202 and/or employee. Other dynamic operational parameters may involve altering audio stream amplification, routing, filtering, and/or signal processing in response to detection or prediction of degraded audio conditions, such as wind, customer location relative to a microphone array, low signal quality, or high signal noise. The proactive generation of the customer strategy and triggers allows the intelligence module 200 and ordering module 160 to efficiently alter from default ordering parameters to provide optimal audio quality and/or automated artificial intelligence interactions that promote customer satisfaction and/or profitability. In contrast, reactively modifying ordering parameters and/or automated interactions can involve delays that frustrate a customer's ordering experience. It is noted that a single system can position the intelligence module 200 either on a single site or in the cloud while being separate from the ordering module 160.

Figure 7:
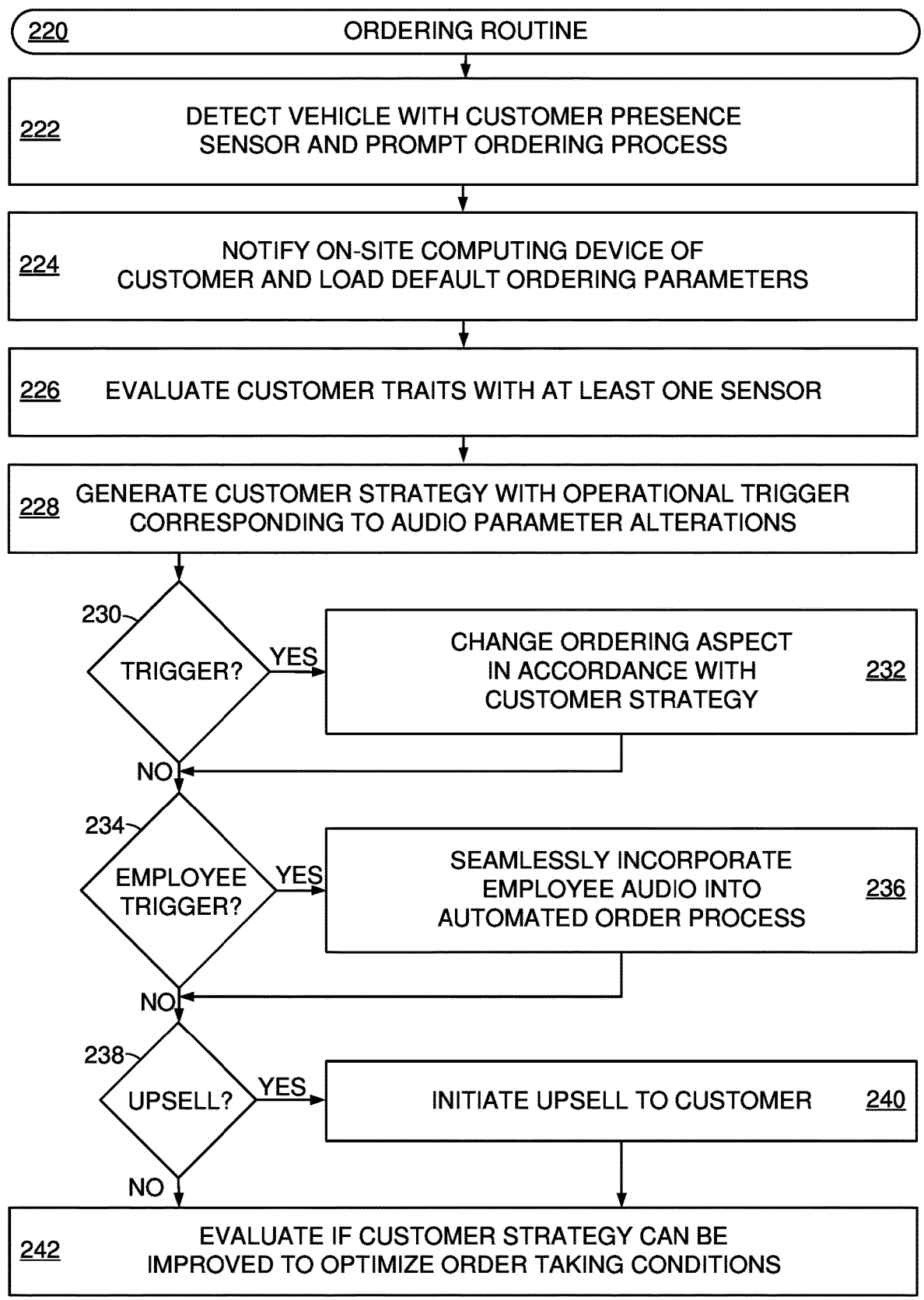
FIG. 7 is an example ordering routine that may be carried out with various embodiments of an ordering system.

FIG. 7 depicts an example ordering routine 220 that can be carried out with the assorted embodiments of FIGS. 1-6. While not limiting or required, step 222 detects a vehicle with a customer presence sensor and prompts a base station to initiate an ordering sequence. The base station then notifies an on-site computing device of a customer, which causes default ordering parameters and intelligence to be loaded in step 224. The default condition allows an order to be initiated via automated intelligence or an employee as customer traits are evaluated in step 226. That is, a default condition can have a human employee greet a customer or execute an automated greeting via the intelligence module while step 226 is conducted.

The evaluation of customer traits can involve one or more sensors, such as optical, acoustic, or ultrasonic detectors, measuring static and/or dynamic aspects of a customer, the customer's car, and customer's speech. Customer traits may prompt the prediction of other ordering aspects, such as ordering speed, volume, and interest in conversation unrelated to an order. The evaluated customer traits allow an intelligence module to generate, or select a preexisting, customer strategy in step 228 that customizes audio parameters and/or automated order intelligence protocol to increase the efficiency, satisfaction, and profitability of an order process. It is noted that step 228 can correspond with one or more triggers that prompt automated, or employee, alterations to audio and/or automated order interactions.

The creation, or selection, of a customer strategy allows decision 230 to determine if a trigger is reached, or is predicted to be reached. Hence, an ordering system can employ circuitry that accurately predicts future customer behavior, audio characteristics, and upsell suggestion success from prior logged customer interactions, model data, and/or prediction algorithms executed on the on-site computing device. If decision 230 detects, or predicts, a trigger being reached, step 232 changes one or more ordering aspects in accordance with the customer strategy. While not limiting, step 232 can utilize the dual audio ports to modify the amplification, filtering, application of digital signal processing, and filtering of an audio stream to, or from, a customer as well as modify how automated intelligence is interacting with a customer, such as speed, tone, or volume of an audio stream to a customer.

Although an employee can communicate directly with the intelligence engine carrying out automated order taking, a customer strategy can prescribe trigger events when an employee is needed to supplement automated order taking. Decision 234 evaluates if such an employee trigger is imminent. If so, step 236 seamlessly injects a recorded message or a real-time communication pathway to a customer. The multiple audio ports of the on-site computing device allows step 236 to splice employee audio with customer and artificial intelligence audio streams without introducing delay, confusion, or interference.

At any point during interaction with a customer, decision 238 can evaluate is an upsell opportunity is present. Some embodiments consult the customer strategy to determine the chance an upsell is successful and initiates the upsell of one or more items in step 240 if the success chance is above a predetermined threshold, such as 50% or 90%. Thus, an on-site computing device can continuously, sporadically, or routinely, compute the chance of a successful upsell based on previously logged customer behavior, model data, executed algorithms, and employee input, which allows for the identification of upsell opportunities while preventing an upsell attempt when there exists a small chance of success.

At the conclusion of an order and/or interactions with a customer, step 242 evaluates the recorded audio streams from the customer, intelligence module, and employee to determine if the selected customer strategy provided the optimal ordering conditions, if the customer strategy can be altered to improve the quality of an ordering process, or if a trigger can be altered to increase the efficiency or profitability of a future order from a customer exhibiting similar traits.

It is noted that any number of audio streams can be combined into other audio streams, such as two streams combining into one stream transmitted to, or from, a customer. Various embodiments can concurrently output multiple different audio streams without combining any streams while other embodiments combine less than all audio streams to create a customized audio delivery to the computing device, a customer, or an employee, depending on need for the system. While it is contemplated that customers remain in vehicles when ordering, such configuration is not required or limiting as a customer can be outside a vehicle, inside a building, or outside a building.

Through the utilization of an on-site computing device with multiple audio ports, customer, employee, and automated intelligence can utilize independent audio streams that can be optimized to improve the ordering experience for the customer. Some embodiments split inbound microphone audio signals from a customer to a base station and the on-site computing device. Audio streams can be optimized with dynamic preamplification, amplification, filtering, and digital signal processing. The multiple audio streams allows an employee to communicate directly with artificial intelligence that conducts automated order taking without delaying, interrupting, or otherwise convoluting the audio stream to/from the customer. The multiple audio streams and computing capabilities of the on-site computing device allows for multiple lanes of a drive-thru retail environment to be concurrently operating while optimized audio signals can prevent interference with wired customer presence sensors.

What is claimed is:

1. A method comprising:
positioning an ordering device outside of a building on a site;
receiving a first audio stream from the ordering device concurrently with a second audio stream from an employee;
recording the first audio stream with a first port of an on-site computing device concurrently while recording the second audio stream with a second port of the on-site computing device;
altering, with the on-site computing device, the first audio stream to slow playback of the first audio stream to interact with an artificial intelligence engine of the on-site computing device; and
combining the first audio stream with the second audio stream with an ordering module of the on-site computing device to provide a seamless third audio stream.

2. The method of claim 1, wherein the first audio stream is altered to clarify a retail order from an on-site customer communicated to the ordering device.

3. The method of claim 1, wherein the third audio stream is played to the customer from the ordering device.

4. The method of claim 1, wherein the ordering module alters an amplification setting for the first audio stream in response to at least one customer trait detected by a sensor of the ordering device.

5. The method of claim 1, wherein the ordering module sets different digital signal processing settings for the first audio stream compared to the second audio stream.

6. The method of claim 1, wherein the ordering module alters an audio setting for the first audio stream while leaving the second audio stream with default audio settings.

7. The method of claim 1, wherein the first audio stream and second audio stream are recorded while the on-site computing device executes an automated ordering process with an intelligence module.

8. The method of claim 1, wherein the on-site computing device records a fourth audio stream via a third port and a fifth audio stream via a fourth port, the first audio stream, second audio stream, fourth audio stream, and fifth audio stream each corresponding with different customers positioned on-site outside the building.

9. The method of claim 8, wherein the ordering module feeds the first audio stream, second audio stream, fourth audio stream, and fifth audio stream into an intelligence engine to concurrently conduct automated ordering processes for each of the different customers.

10. A method comprising:
positioning an ordering device outside of a building on a site;
receiving a first audio stream from the ordering device concurrently with a second audio stream from an employee;
capturing the first audio stream with a first port of an on-site computing device while capturing the second audio stream with a second port of the on-site computing device;
executing a customer strategy with an intelligence module of the on-site computing device connected to the ordering device, the customer strategy directing automated interactions between the intelligence module and a first on-site customer to compile a retail order, the automated interactions involving the intelligence module generating new and unique text to converse with the on-site customer, converting the text to speech, and relaying the speech to the on-site customer; and
communicating directly to the intelligence module from the employee via the second port without interrupting the first audio stream.

11. The method of claim 10, wherein a third audio stream is concurrently received from the ordering device via a third port, the third audio stream corresponding to a second on-site customer.

12. The method of claim 10, wherein the employee alters at least one operating parameter of the intelligence module without disabling the intelligence module.

13. The method of claim 10, wherein the intelligence module interacts with the first on-site customer while the employee communicates with the intelligence module.

14. The method of claim 10, wherein the intelligence module communicates with the first on-site customer with a text-to-speech circuit that converts text generated by the intelligence module into audible speech.

15. The method of claim 14, wherein the employee changes a portion of the retail order.

16. The method of claim 10, wherein the employee is prompted to communicate with the intelligence module in response to a predetermined employee trigger event being detected by the on-site computing device.

17. The method of claim 10, wherein the intelligence module records the communication from the employee and seamlessly incorporates the communication into the first audio stream to the first on-site customer.

18. An apparatus comprising:
    an ordering station connected to a computing device on a site via a first electrical interconnection; and
    a customer presence sensor connected to the computing device on the site via a second electrical interconnection positioned in a common conduit as the first electrical interconnection, the second electrical interconnection customized to prevent audio signals passing through the first electrical interconnection from interfering with operation of the customer presence sensor.

19. The apparatus of claim 18, wherein the computing device inserts at least one delay into an audio stream to prevent interference with the operation of the customer presence sensor.

20. The apparatus of claim 18, wherein the first electrical connection has at least one capacitor to limit transient signals in the first electrical connection during transmission of audio signals through the first electrical connection.

* * * * *